(12) United States Patent
Matz et al.

(10) Patent No.: US 8,088,240 B2
(45) Date of Patent: Jan. 3, 2012

(54) ASSEMBLY PROCESS AND PLASTIC COMPOSITE TUBE

(75) Inventors: Pierre Matz, Nil Saint-Vincent (BE); Frederic Beullekens, Rixensart (BE); Claude Dehennau, Waterloo (BE)

(73) Assignee: Egeplast Werner Strumann GmbH & Co. KG, Greven (DE)

( * ) Notice: Subject to any disclaimer, the term of this patent is extended or adjusted under 35 U.S.C. 154(b) by 459 days.

(21) Appl. No.: 12/272,236

(22) Filed: Nov. 17, 2008

(65) Prior Publication Data
US 2009/0071595 A1  Mar. 19, 2009

Related U.S. Application Data

(63) Continuation of application No. 10/505,456, filed as application No. PCT/EP03/02073 on Feb. 28, 2003, now abandoned.

(30) Foreign Application Priority Data

Mar. 4, 2002 (FR) ..................................... 02 02732

(51) Int. Cl.
*B32B 37/00* (2006.01)

(52) U.S. Cl. ..... 156/190; 156/192; 156/195; 156/272.2; 156/272.4

(58) Field of Classification Search ............... 156/272.8, 156/190, 192, 195, 272, 4, 272.2
See application file for complete search history.

(56) References Cited

U.S. PATENT DOCUMENTS

| | | | | |
|---|---|---|---|---|
| 3,560,291 A | * | 2/1971 | Foglia et al. | 156/229 |
| 3,802,985 A | * | 4/1974 | Leatherman | 156/244.25 |
| 4,093,004 A | * | 6/1978 | Kile et al. | 138/140 |
| 5,888,331 A | * | 3/1999 | Greig | 156/187 |
| 6,605,171 B1 | * | 8/2003 | Debalme et al. | 156/172 |
| 2004/0118471 A1 | | 6/2004 | Dehennau et al. | |

FOREIGN PATENT DOCUMENTS

| | | |
|---|---|---|
| DE | 199 54 440 | 6/2001 |
| EP | 337776 | 10/1989 |
| EP | 904441 | 5/2000 |
| GB | 2 103 147 | 2/1983 |
| GB | 2276584 | 10/1994 |
| JP | 54-54178 A * | 4/1979 |
| WO | WO -95/04656 A1 * | 2/1995 |
| WO | WO02/088589 | 11/2002 |

* cited by examiner

*Primary Examiner* — Jeff Aftergut
(74) *Attorney, Agent, or Firm* — Occhiuti Rohlicek & Tsao LLP

(57) ABSTRACT

Process for assembling, by fusion bonding using IR laser radiation, plastic multilayer tapes that comprise an oriented layer that is transparent to the radiation and a layer that absorbs this radiation, the tapes being fusion-bonded using the same technique to a plastic preformed support. Composite tube resulting from the fusion bonding of these tapes to a plastic core.

18 Claims, No Drawings

ASSEMBLY PROCESS AND PLASTIC COMPOSITE TUBE

CROSS REFERENCE TO RELATED APPLICATIONS

This is a continuation application of U.S. Ser. No. 10/505,456, filed on Sep. 2, 2004, now abandoned, which is a national phase application of PCT/EP03/02073 filed on Feb. 28, 2003, which in turn claims priority to French Application 0202732 filed on Mar. 4, 2002. The contents of all of the prior applications are incorporated by reference in their entireties.

The present invention relates to a process for assembling plastic multilayer tapes by means of electromagnetic radiation.

For various applications, it is often sought to produce a plastic assembly that improves the mechanical strength properties of the components of the assembly.

For example, it is known to produce plastic composite structures of high rigidity and high mechanical strength by assembling oriented plastic elements using the technique of fusion bonding. In particular, it is possible to compress stacks of oriented plastic fibres maintained at a temperature close to their melting point so as to keep the molten surface parts in intimate contact and to assemble them by fusion bonding.

However, this process is lengthy to implement and difficult to control. It can really be used only for assembling compact plastic elements (Patent Application GB-A-2 253 420).

Also known, from European Patent EP-B1-0 904 441 is a process for producing grids from two arrays of parallel strips made of oriented plastic, which are fusion-bonded using an infrared laser, the two arrays of strips making between them an angle close to 90°. Each strip has a two-layer structure comprising a layer transparent to the infrared radiation and a carbon-black-filled layer that absorbs the radiation.

However, this process provides a structure that remains flexible and is not suitable for producing hollow bodies that have to withstand pressure.

One object of the invention is to provide a process that does not have the drawbacks of known processes and is suitable for producing impermeable hollow bodies capable of withstanding pressure.

Another object of the invention is to facilitate the assembly operations when they are carried out by the technique of fusion bonding.

For this purpose, the invention relates to a process for assembling multilayer tapes, which comprises the fusion bonding of the tapes by means of electromagnetic radiation, the tapes comprising at least one plastic layer, which is oriented in at least one direction and is transparent to this radiation, and at least one layer that partially absorbs the energy transported by this radiation, according to which one face of at least one tape of the assembly is fusion-bonded to a plastic preformed support.

The expression "process for assembling tapes" is understood to mean a process that joins the preformed support and the tapes together so that, from the standpoint of their mechanical properties, they behave as if it were now formed from a single body.

The process according to the invention relates to multilayer tapes, that is to say tapes formed by the superposition of at least two layers of different composition.

In this process, the assembly operation is carried out by fusion-bonding the tapes to one another and to the preformed support. The term "fusion bonding" denotes the assembly technique consisting in melting material over a small depth of the surface of the tapes to be assembled and then in pressing the tapes together onto the support in such a way that the molten surfaces touch one another and the molten material of which they are composed interpenetrates.

According to the invention, the melting is obtained by illuminating the surface of the tapes to be fusion-bonded by means of high-energy radiation.

In the process according to the invention, this high-energy radiation is electromagnetic radiation. The illumination may be performed after each individual layer of tapes has been laid, during the winding operation, or after the latter has been completed over the length of the tube. It may also be performed in a single step, after all the tape layers have been laid, simultaneously with the operation of winding the last tape or, in contrast, after the last tape layer has been laid over the entire length of the tube.

The material of the tapes of the process according to the invention is formed from a plastic. The term "plastic" is understood to mean any material comprising at least one synthetic resin polymer.

As plastic, any type of thermoplastic may be suitable.

The term "thermoplastic" is understood to mean any thermoplastic polymer, including thermoplastic elastomers and blends thereof. The term "polymer" is understood to mean both homopolymers and copolymers (especially binary or ternary copolymers). Non-limiting examples of such copolymers are random copolymers, linear or other block copolymers and graft copolymers.

Any type of thermoplastic polymer or copolymer whose melting point is below the decomposition temperature is suitable. Synthetic thermoplastics having a melting range spread over at least 10 degrees Celsius are particularly suitable. Examples of such materials are those that have a polydispersion in their molecular weight.

In particular, it is possible to use polyolefins, polyvinyl halides, thermoplastic polyesters, polyketones, polyanides and copolymers thereof. A blend of polymers or copolymers may also be used, as may a blend of polymeric materials with inorganic, organic and/or natural fillers such as, for example, but not limitingly, carbon, salts and other inorganic derivatives, natural or polymeric fibres.

Polyolefins have given good results. Among polyolefins, high-density polyethylene (HDPE) is preferred.

In the assembly process according to the invention, plastic tapes having a multilayer structure are used. Preferably, they comprise at least one oriented layer. The term "oriented layer" is understood to mean a layer of plastic in which at least 20% by weight of the molecular chains of the polymers making up its composition are arranged in at least one same direction. The oriented layers may be so arranged in several different directions. Each of the tapes may thus comprise layers oriented simultaneously in more than one direction. As a variant, the tapes may also comprise layers each oriented in a single direction, which is different for each tape. More preferably, the oriented layers of the tapes are oriented in one and the same direction.

According to the invention, at least one oriented layer of the tapes used in the process is transparent to the electromagnetic radiation employed for the fusion bonding. The term "transparent" denotes a layer that does not absorb more than 100 J per gram of material of the transparent layer.

In the process according to the invention, the tapes used also include at least one layer that partially absorbs the energy transported by the electromagnetic radiation. The term "partial absorption" is understood to mean an absorption of the radiation energy that is not less than 300 J per gram of material of the absorbent layer.

According to the invention, one face of at least one tape of the assembly is also fusion-bonded to a plastic support. The plastic of the support may be identical to that of the transparent layer of the tapes. On the other hand, it may also constitute a plastic different in nature from that of the transparent layer of the tapes.

Preferably, the fusion bonding of one face of at least one tape of the assembly is carried out using the same electromagnetic radiation fusion bonding technique as that employed for bonding the tapes together.

It does not matter whether the plastic support to which the tapes are fusion-bonded is of oriented or unoriented structure.

Preferably, the structure of the plastic support is not oriented.

The number of tapes that can be fusion-bonded in the process according to the invention in order to form the assembly may vary widely. It is generally preferred to bond together an even number of tapes. In particular, useful results have been obtained when at least two tapes have been fusion-bonded. Particularly useful results have been obtained when at least four tapes are fusion-bonded. Preferably, at most eight tapes are fusion-bonded.

In a preferred method of implementing the process according to the invention, the electromagnetic radiation used has a wavelength of at least 700 nm. Likewise, it is preferred to use electromagnetic radiation whose wavelength is at most 1200 nm.

Most preferably, the electromagnetic radiation is infrared radiation. An IR source with a continuous spectrum over the entire range of frequencies emitted may be suitable, particularly sources that emit mainly in the range of wavelengths not absorbed by the transparent layers of the tapes. Such IR sources are, for example, those with a very short wavelength, such as those emitting in the region of 1000 nm.

The best results were obtained with coherent infrared radiation of the laser type. Examples of sources of such radiation are diode lasers and Nd:YAG (neodymium-doped yttrium aluminate garnet) lasers.

According to one particularly beneficial method of implementing the process according to the invention, the tapes are wound around a support of tubular shape and fusion-bonded. The result obtained by the assembly process is in this case a tube reinforced by at least one layer of oriented plastic tapes.

The tubular support is generally made of plastic. The nature of this plastic chosen from those that are compatible with fusion bonding with the plastic of the absorbent layers of the tapes. Advantageously, an unoriented plastic may be chosen for the tubular support.

In the process according to the invention, the nature of the material responsible for absorbing the radiation may vary. It is chosen from compositions that are capable of being easily blended with the plastic of the absorbent layers in which these compositions are incorporated. Good results have been obtained with carbon black. Preferably, the absorption of the electromagnetic radiation is not total. Moreover, an absorption value sufficient to generate heat must be respected. In practice, absorption levels of at least 300 J per gram of material of the absorbent layer have given good results.

One advantageous method of implementing the process according to the invention, compatible with the methods of implementation described above, consists in producing a tube whose wound and fusion-bonded tapes at its external periphery make an angle to the direction of the tube ranging from 40 to 70°. Excellent results have been obtained when this angle is close to 55°. Arrangements may furthermore be made for each thickness of tape bonded to the previous thickness to be crossed with the latter. In practice, good results have been obtained when the angle to the direction of the tube is the opposite of that of the thickness of the previous tape.

The invention also relates to a plastic composite tube comprising an unoriented plastic core in which at least two adjacent thicknesses of multilayer tapes are fusion-bonded, the said tapes being wound and bonded together, according to which at least one layer of each tape is formed from a plastic transparent to the electromagnetic radiation and oriented in at least one direction and according to which at least one other layer of each tape comprises a material that absorbs this electromagnetic radiation.

Preferably, the adjacent thicknesses of tapes are crossed, that is to say they are arranged so as to make between them an angle ranging from 80 to 140°.

The particular terms defined above in the case of the process according to the invention have the same meaning here for the composite tube. The various alternative ways of implementing the process described above may also apply in respect of the composite tube according to the invention.

Preferably, the layers of tapes comprising the absorbent material are oriented in the same way as the transparent layers. The orientation may be completely independent of that of the transparent layers or, alternatively, it may be preferable for the orientation of the absorbent layers to be placed in the same direction as that of the transparent layers.

In one particular embodiment of the tube according to the invention, it comprises tapes consisting of a single layer of transparent oriented material placed between two thinner layers comprising the same plastic, which is oriented in the same direction, as the transparent layer and furthermore including a material that absorbs this radiation. In this embodiment, the transparent layer of each of the tapes advantageously has an electromagnetic radiation absorption at wavelengths ranging from 700 to 1200 nm not exceeding 100 J per gram of material of the transparent layer.

The examples that follow are given for the purpose of illustrating the invention without in any way limiting the scope thereof.

A bilayer tape was firstly produced by coextrusion in a flat die 400 mm in width with an opening 5 mm in height fed via a semilunar feedblock connected to two extruders, the first of 60 mm in diameter, with a grooved barrel and a barrier extrusion screw rotating at 50 rpm and outputting 50 kg/h of a high-density polyethylene from Solvay Polyolefin Europe with the brand name ELTEX® PE 100 TUB 121 identical to the commercial resin apart from the absence of pigment for the transparent layer, and the second 30 mm in diameter, fitted with a polyolefin screw rotating at 10 rpm and outputting 0.5 kg/h for the absorbent layer. The resin used in the second extruder for the absorbent layer was the commercial resin ELTEX® PE 100 TUB 121 containing a carbon black filler.

The bilayer sheet exiting the die was then passed through a smoothing calender at 50° C. and converted into oriented tape by thermal conditioning at 115° C., by passing it over a group of six conditioning rolls followed by a drawing operation in two successive passes in a drawing train, the rolls of which were rotating at increasing speed (680% drawing in the first pass and 30% in the second pass). The oriented tape was then cooled and underwent a slight shrinkage of about 10% in the longitudinal direction.

The oriented tapes were then wound manually onto a tubular core made of ELTEX® PE 100 TUB 121 high-density polyethylene 50 mm in outside diameter and 3.2 mm in wall thickness in such a way that two successive thicknesses were crossed at angles of +55° and −55° with respect to the axis of the tube, the carbon-black-filled layer facing the tube.

Next, the tapes were wound over the entire external surface of the tube, after which the tapes were fusion-bonded to one another and to the tube by sweeping the entire surface of this tube carrying the wound tapes by means of a diode laser source of the COHERENT® brand of 30 W power and 800 nm wavelength, the beam of which was collimated to a diameter of 8 mm. The linear speed of fusion bonding and of advance of the tube in the laser beam was 0.72 m/min.

The burst strength of the tube obtained was then compared with that of an identical tube that had not undergone the last operation of fusion-bonding the tapes by means of the laser radiation. The results obtained were the following:

|  | Fusion-bonded tapes | Laid tapes (not fusion-bonded) |
|---|---|---|
| Burst pressure (bar) | 120 | 80 |

It may be seen that fusion-bonding the tapes has increased the burst strength by 50%.

Since the tube obtained with the fusion-bonded tapes is composed of only a single type of resin, comprising locally carbon black, it is usually possible to recycle the manufacturing scrap into the process for manufacturing the tubular core.

The invention claimed is:

1. A process for assembling multilayer tapes comprising:
   providing first and second fusion-bondable tapes, each tape containing two plastic layers in contact with each other, wherein one of the two layers is transparent to electromagnetic radiation and the other layer partially absorbs electromagnetic radiation, the transparent layer being oriented in at least one direction;
   winding the first tape around a tubular support in such a manner that the radiation-absorbing layer of the first tape is in contact with the outer surface of the tubular support;
   winding the second tape around the first tape in such a manner that the radiation-absorbing layer of the second tape is in contact with the transparent layer of the first layer; and
   applying electromagnetic radiation to the wound tapes to form fusion-bonding between the first and second tapes and between the tubular support and the first tape.

2. The process of claim 1, wherein the first and second tapes are wound in such a manner that the at least one orientation direction of the transparent layer of the first tape is 40-70° from the axial direction of the tubular support and is 80-140° from the at least one orientation direction of the transparent layer of the second tape.

3. The process of claim 1, wherein the electromagnetic radiation has a wavelength ranging from 700 to 1200 nm.

4. The process of claim 1, wherein the electromagnetic radiation is laser radiation.

5. The process of claim 1, wherein, in each of the two tapes, the transparent layer is oriented in a single direction.

6. The process of claim 5, wherein the first and second tapes are wound in such a manner that the orientation directions of the tranparent layers of the first and second tapes are +55° and −55° from the axial direction of the tubular support, respectively.

7. The process of claim 3, wherein the electromagnetic radiation is laser radiation.

8. The process of claim 7, wherein, in each of the two tapes, the transparent layer is oriented in a single direction.

9. The process of claim 8, wherein the first and second tapes are wound in such a manner that the orientation directions of the tranparent layers of the first and second tapes are +55° and −55° from the axial direction of the tubular support, respectively.

10. A process for preparing an enhanced tubular support comprising:
    preparing, by coextrusion, first and second fusion-bondable tapes, each tape containing two plastic layers in contact with each other, wherein one of the two layers is transparent to electromagnetic radiation and the other layer partially absorbs electromagnetic radiation, the transparent layer being oriented in at least one direction;
    winding the first tape around a tubular support in such a manner that the radiation-absorbing layer of the first tape is in contact with the outer surface of the tubular support;
    winding the second tape around the first tape in such a manner that the radiation-absorbing layer of the second tape is in contact with the transparent layer of the first layer; and
    applying electromagnetic radiation to the wound tapes to form fusion-bonding between the first and second tapes and between the tubular support and the first tape.

11. The process of claim 10, wherein the first and second tapes are wound in such a manner that the at least one orientation direction of the tranparent layer of the first tape is 40-70° from the axial direction of the tubular support and is 80-140° from the at least one orientation direction of the transparent layer of the second tape.

12. The process of claim 10, wherein the electromagnetic radiation has a wavelength ranging from 700 to 1200 nm.

13. The process of claim 10, wherein the electromagnetic radiation is laser radiation.

14. The process of claim 10, wherein, in each of the two tapes, the transparent layer is oriented in a single direction.

15. The process of claim 10, wherein the first and second tapes are wound in such a manner that the orientation directions of the tranparent layers of the first and second tapes are +55° and −55° from the axial direction of the tubular support, respectively.

16. The process of claim 12, wherein the electromagnetic radiation is laser radiation.

17. The process of claim 16, wherein, in each of the two tapes, the transparent layer is oriented in a single direction.

18. The process of claim 17, wherein the first and second tapes are wound in such a manner that the orientation directions of the tranparent layers of the first and second tapes are +55° and −55° from the axial direction of the tubular support, respectively.

* * * * *